(12) United States Patent
Rauhala et al.

(10) Patent No.: US 6,184,592 B1
(45) Date of Patent: Feb. 6, 2001

(54) SYSTEM AND METHOD FOR SUPPLYING POWER TO AN EXPANSION CARD

(75) Inventors: Jyri Rauhala, Tampere; Sami Inkinen, Hämeenlinna; Markus Suomi, Tampere; Olli-Pekka Lunden, Suinula; Martti Ojanen, Oulu; Vesa Köppä, Tampere; Ari Aho, Tampere; Janne Kuusinen, Tampere; Jouni Rapakko, Kylmäkoski, all of (FI)

(73) Assignee: Nokia Mobile Phones Limited, Espoo (FI)

(*) Notice: Under 35 U.S.C. 154(b), the term of this patent shall be extended for 0 days.

(21) Appl. No.: 09/199,668

(22) Filed: Nov. 25, 1998

(30) Foreign Application Priority Data

Dec. 1, 1997 (FI) ..................................... 974382

(51) Int. Cl.⁷ ................................................. H02H 9/00
(52) U.S. Cl. .............................. 307/43; 323/908; 307/41
(58) Field of Search ................................ 307/38, 41, 43; 361/166; 713/330; 323/908

(56) References Cited

U.S. PATENT DOCUMENTS

| | | | |
|---|---|---|---|
| 5,057,847 | * 10/1991 | Vaisanen | 343/702 |
| 5,059,131 | * 10/1991 | Kukkonen et al. | 439/78 |
| 5,263,178 | * 11/1993 | Liukkonen | 455/76 |
| 5,268,819 | * 12/1993 | Lonka | 361/785 |
| 5,272,584 | * 12/1993 | Austruy et al. | 361/58 |
| 5,353,328 | * 10/1994 | Jokimies | 379/58 |
| 5,392,282 | * 2/1995 | Kiema | 370/77 |
| 5,414,863 | 5/1995 | Lee et al. | 395/750 |
| 5,446,772 | * 8/1995 | Korhonen | 375/257 |
| 5,490,235 | * 2/1996 | Von Holten et al. | 395/2.79 |
| 5,530,302 | * 6/1996 | Hamre et al. | 307/147 |
| 5,546,590 | * 8/1996 | Pierce | 395/750 |
| 5,589,719 | 12/1996 | Fiset | 307/131 |
| 5,678,229 | 10/1997 | Seki et al. | 455/343 |
| 5,703,769 | * 12/1997 | Murray | 363/50 |
| 5,731,639 | * 3/1998 | Ohara et al. | 307/41 |
| 5,764,926 | * 6/1998 | Fukuda et al. | 361/58 |
| 5,782,646 | 7/1998 | Broadfields et al. | 439/346 |
| 5,802,351 | * 9/1998 | Frampton | 395/500 |
| 5,809,115 | * 9/1998 | Inkinen | 379/93.05 |
| 5,822,692 | * 10/1998 | Krishan et al. | 455/419 |
| 5,836,790 | * 11/1998 | Barnett | 439/620 |
| 6,008,550 | * 12/1999 | Dorsey et al. | 307/141 |

OTHER PUBLICATIONS

Finnish Official Action and English translation thereof. (No Date).

* cited by examiner

*Primary Examiner*—Josie Ballato
*Assistant Examiner*—Roberto Rios
(74) *Attorney, Agent, or Firm*—Perman & Green, LLP

(57) ABSTRACT

A method and system for the arrangement of a power supply with an expansion card which can be connected to an electronic device and comprises at least a first and a second circuit. The power supply is arranged in at least two stages, wherein at the first stage, at least one operating voltage (Vcc) is connected to the first circuit, and at the second stage, the at least one operating voltage (Vcc) is connected to the second circuit.

10 Claims, 3 Drawing Sheets

SYSTEM AND METHOD FOR SUPPLYING POWER TO AN EXPANSION CARD

BACKGROUND OF THE INVENTION

1. Field of the Invention

The present invention relates to a method for the arrangement of power supply with an expansion card as set forth in the appended claim 1, an expansion card as set forth in the appended claim 6, and a mobile station as set forth in the appended claim 10.

2. Prior Art

The PCMCIA connection (Personal Computer Memory Card International Association) is a known connection used with electronic devices for connecting expansion cards, such as memory cards (e.g. FLASH memory cards), modems and various input/output (I/O) cards with the electronic device. Thus, the electronic device and the PCMCIA card are provided with connectors complying with the PCMCIA standard so that the connector of the electronic device is a so-called male connector, i.e. it has connector pins, and the card connector is a so-called female connector, i.e. it has conductor sockets, wherein when the PCMCIA card is connected with the PCMCIA connection of the electronic device, an electric coupling is formed between each connector pin and the corresponding conductor socket. The PCMCIA standard defines the usual functions for each connector pin and corresponding conductor socket. Consequently, for example in an application where the PCMCIA connection is implemented in a computer, each data line in the data bus of the computer is connected to one connector pin in the PCMCIA connection. Further, at least some of the address and control lines are connected to the connector.

PCMCIA cards have the size of a credit card (85.6 mm×54 mm), but the thickness of the cards may be 3.3 mm (type I), 5.0 mm (type II) or 10.5 mm (type III). Electrically, the PCMCIA cards are connected with an electronic device as an 8/16 bit I/O connection or memory. The card complying with the PCMCIA standard has a memory area which is readable to the electronic device and contains information for identifying the card, i.e. an information structure data file (card information structure, CIS) which is also called a configuration means.

Particularly in connection with portable computers (Laptop PC), mobile station applications have been developed in which at least the transmitter/receiver unit of the mobile station Is arranged in the PCMCIA standard card form. The unit used for controlling the operation of the card is advantageously a microcontroller (MCU) comprising e.g. a processor, a memory (RAM, ROM), and I/O lines for connecting the microcontroller with the other electronics of the card. Further, an external memory can be connected to the microcontroller.

The transmitter comprises e.g. a modulator for modulating the signal to be transmitted, filters particularly for attenuating spurious emissions, a mixer where the modulated signal is mixed with the local oscillator frequency for generating a radio-frequency signal, and a power amplifier for amplifying the signal to be transmitted. The amplified signal is transmitted to an antenna which is coupled to the card e.g. via a cable. The receiver comprises e.g. filters for filtering received signals: a mixer for converting the received radio-frequency signal to an intermediate frequency or, in a direct conversion type receiver, to the baseband frequency: and a detector for demodulating the received signal.

When an expansion card according to e.g. the PCMCIA standard is connected to the PCMCIA expansion card connection of a computer, the operating voltages of the expansion card are switched on at the same time when the expansion card is inserted in its place.

Another known solution for the arrangement of the power supply to the expansion card is that the expansion card is provided with a switch whereby the power supply can be turned on and off when necessary. This solution requires that a switch is arranged in the expansion card, which increases the manufacturing costs of the expansion card, and further, the switch requires space on the expansion card. Another disadvantage in such an arrangement is that the power required by the expansion card upon turning on may rise to a great level. This will result in a momentary peak in the current intensity, which may induce current peaks in the power supply circuits of the computer, and the current intensity may momentarily exceed the maximum value allowed for the voltage supply pins of the connector.

SUMMARY OF THE INVENTION

It is an aim of the present invention to achieve a novel arrangement for supplying power to the expansion card. The invention is based on the idea that the power supply to the expansion card is controlled by the data processor so that the operating voltages are switched on at two or more stages to the expansion card. Further, the switching of the operating voltages can be automated, wherein after inserting the expansion card, the data processor will control the turning on of the operating voltages to the expansion card automatically. The method of the present invention is characterised in what will be presented in the characterising part of the appended claim 1. The expansion card of the invention is characterised in what will be presented in the charactersing part of the appended claim 6. Further, the mobile station of the invention is characterised in what will be presented in the characterising part of the appended claim 10.

The present invention presents significant advantages to the methods and expansion cards of prior art. When the operating voltages are connected to the expansion card by the method according to the invention, high current strengths are avoided during the turning on, whereby it is possible to avoid the occurrence of voltage and current peaks in the power supply connections of the data processor and to prevent exceeding of the maximum current strength allowed in the connector. Moreover, the expansion card of the invention can be controlled by the data processor so that the user can, if desired, switch on the operating voltages to the expansion card e.g. when setting up a voice connection or a data transmission connection via a mobile communication network, and after disconnecting, the user can control the switching off of the voltages. Further, a separate operating voltage switch will not be required in the expansion card according to the invention.

BRIEF DESCRIPTION OF THE DRAWINGS

In the following, the invention will be described in more detail with reference to the appended drawings, in which.

DETAILED DESCRIPTION OF THE PREFERRED EMBODIMENT

Figure 1:
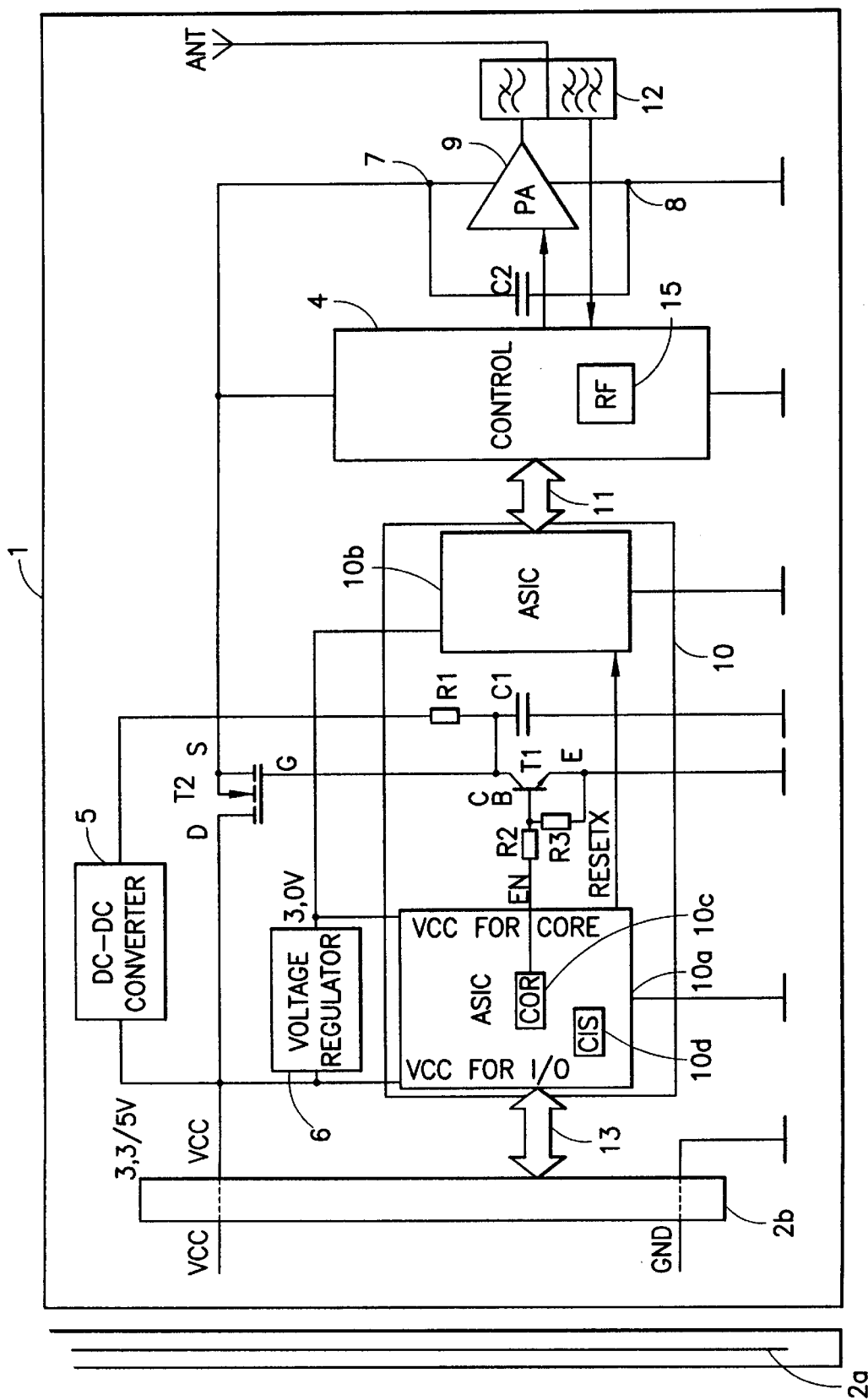
FIG. 1 shows an expansion card according to an advantageous embodiment of the invention in a reduced block diagram.

The appended FIG. 1 shows an expansion card 1 according to an advantageous embodiment of the invention in those respects which are needed for understanding the invention. FIG. 1 shows primarily the power supply arrangements. The expansion card 1 comprises an expansion card connection 2b by which the expansion card is arranged to be connected with the electronic device 3, e.g. a portable data processor. The electronic device 3 has a corresponding expansion card connection 2a, such as a connection complying with the PCMCIA standard. Thus, the expansion card connection 2a of the electronic device comprises advantageously a male connector (not shown), to which the expansion card 1 is connected by means of the expansion card connection 2b of the expansion card, comprising advantageously a female connector (not shown). In the following, this expansion card connection 2a of the electronic device and the expansion card connection 2b of the expansion card are referred to by the joint term "expansion card connection" and indicated by the reference numeral 2. This expansion card connection 2 can be also different connection than one complying with the PCMCIA standard. The expansion card connection 2 comprises advantageously an address bus, a control bus and a data bus. These buses are indicated by a single bus 13 in the appended FIG. 1, and person skilled in the art will know how these buses can be implemented, but the practical implementation of the buses is not significant for understanding this invention.

A control block 4 in the expansion card 1 comprises e.g. a controller, such as a microcontroller unit (MCU); a memory, such as a read-only memory (ROM), for storing application software and the like; a random access memory (RAM) e.g. for storing data during the use; and a digital signal processing unit (DSP). Further, the control block comprises means for connecting the controller and the digital signal processing unit in data communication with each other, for example a dual port memory circuit (dual port RAM).

For arranging a data transmission connection between the expansion card 1 and the electronic device 3, the expansion card 1 has a bus adapter 10 which is implemented advantageously with an application-specific integrated circuit (ASIC). In FIG. 1. this bus adapter 10 is shown in two blocks, the first adapter block 10a comprising primarily the connector means of the expansion bus, the control block for the bus adapter, and a controlling means e.g. a configuration option register (COR) 10c. The second adapter block 10b comprises means for data transmission between the bus adapter 10 and the control block 4. The data transmission connection between the bus adapter (PCMBUS) and the control block 4 comprises e.g. two serial buses: an asynchronous serial bus (ASIO) and a synchronous serial bus (PCMBUS), which are shown in a single bus 11 in the block diagram of FIG. 1.

For arranging the power supply in the expansion card 1 the functional elements of the expansion card 1 are divided into two circuits. In this advantageous embodiment of the expansion card 1 the first circuit comprises a bus adapter 10, a voltage regulator 6 and a voltage converter 5. The second circuit comprises a control block 4, a transmitter/receiver unit 15 and a high-frequency power amplifier 9. It is obvious that the expansion card 1 can be divided also into more circuits, to which the operating voltages Vcc can be connected at different times, but in this specification, the invention is described by means of said two circuits.

In this specification, the turning on of the operating voltages Vcc indicates that the voltage is connected to the circuit so that the circuit is fully operational. Within the scope of the invention, it is possible to switch also other voltages to different circuits even at an earlier stage, but these do not make the circuit fully operational.

The operating voltages of the second circuit are turned on by means of a control transistor T1 and a switching transistor T2. With respect to the control transistor T1, a first biasing resistor R2 is connected to the enabling line EN which is arranged in a functional connection with the switching data of the operating voltages defined advantageously in the configuration option register COR. With respect to the control transistor T1, also a second biasing resistor R3 is connected to the emitter E, wherein the first R2 and the second biasing resistor R3 constitute a voltage divider. Collector C in the control transistor is connected to gate G in the switching transistor T2. The conductivity of the switching transistor T2 can be controlled by a voltage connected to the gate G (gate voltage), i.e. in this circuit arrangement by the collector voltage of the control transistor T1. When the gate voltage is approximately 0 V, the switching transistor T2 does not conduct, i.e. it corresponds to an opened switch. When the gate voltage exceeds the switching limit, the drain source channel of the switching transistor starts to conduct, which corresponds to closing of the switch. The switching limit is affected e.g. by the strength of the current to be turned on. It is one purpose of the voltage converter 5 to raise this gate voltage to a sufficient level.

A retardation capacitor C1 is connected between the collector C of the control transistor T1 and the ground potential. Further, a voltage supply resistor R1 is connected between the collector of the control transistor T1 and the voltage converter 5. In this embodiment, the voltage converter 5 raises the value of the supply voltage Vcc to an approximately double level for accomplishing a sufficient control voltage to the switching transistor T2. The voltage supply resistor R1 and the retardation capacitor C1 constitute a retardation circuit by which an increase in the voltage of the gate G of the switching transistor T2 is retarded at the moment of turning on. This will retard the turning on of the switching transistor T2.

The transmitter/receiver unit 15 of the expansion card according to FIG. 1 is a transceiver unit complying e.g. with the GSM standard, for conducting e.g. signal modulation/demodulation and channel coding/decoding, as known. The transmitter of the transceiver unit 15 comprises also here a high-frequency power amplifier 9 where the signal to be transmitted Into the mobile communication network is amplified before transmitting to an antenna ANT. An antenna adapter 12 prevents e.g. the entry of spurious emissions to the antenna ANT and comprises a band pass filter for attenuating signals outside the receiving frequency area of the receiver, received by the antenna ANT.

The power required by the high-frequency power amplifier 9 may vary to a great extent during the use, wherein the high-frequency power amplifier 9 can cause high current peaks in the voltage supply lines. For eliminating this, one or several capacitors C2 are connected between the operating voltage pin 7 and the ground potential pin 8 of the high-frequency power amplifier 9. However, because of this capacitor C2, the charging of the capacitor C2 after turning on of the operating voltages of the high-frequency power amplifier 9 may induce a high current strength in the operating voltage lines. The above-mentioned retardation circuit R1, C1 will retard the turning on of this operating voltage, eliminating the occurrence of current peaks to a great extent in connection with the loading of the capacitor C2. The retardation circuit R1, C1 can also be formed of several separate retardation circuits.

Figure 2:
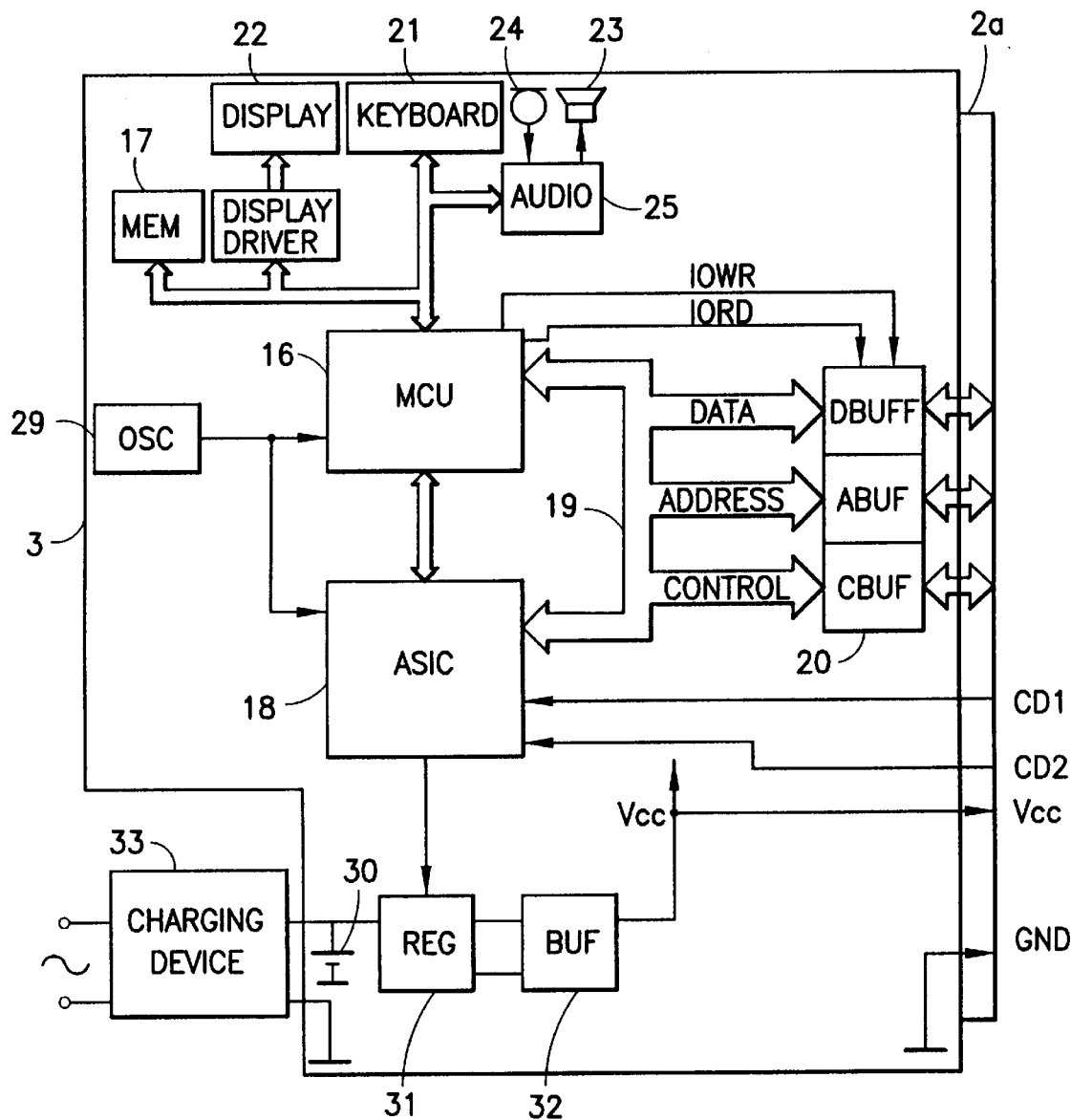
FIG. 2 shows an electronic device in which the expansion card according to an advantageous embodiment of the invention can be inserted.

In FIG. 2, the electronic device 3 comprises e.g. a controller 16 which can be for example a microprocessor or a microcontroller. The electronic device 3 is also provided with a memory 17, such as a read-only memory, a random access memory and possibly also a writeable mass memory. Some of the logic functions required for the operation of the electronic device 3 are implemented advantageously with an application specific logic circuit 18 which is arranged in a data transmission connection e.g. with the controller 16 of the electronic device. A connector bus 19 is connected from the controller 16 and the application-specific logic circuit 18 to the expansion card connection 2a of the electronic device. This connector bus 19 comprises e.g. an address bus, a control bus and a data bus. The expansion card connection 2a of the electronic device is usually provided also with bus buffering means 20 which connect the connector bus 19 and the expansion card connection 2a in a way that possible external disturbances do not easily damage the components of the electronic device 3. The more detailed implementation of these bus buffering means 20 will be obvious to an expert in the field.

Further, the electronic device 3 of FIG. 2 is equipped with a keypad 21 by means of which the user can control the operation of the electronic device 3 and enter various data. A display device 22 can be used by the electronic device 3 for displaying information to the user. Further, the electronic device 3 can comprise a loudspeaker 23 and an ear piece 24 which are connected by an audio block 25 to the controller 16. The loudspeaker 23 and the microphone 24 can be used e.g. in connection with a voice call, wherein a loudspeaker and a microphone are not necessarily required in the expansion card 1 used as a mobile station. A clock circuit 29 in the electronic device generates timing signals required for the operation of the electronic device 3. The operating voltage Vcc is supplied e.g. by means of a battery 30, a regulation block 31 and a buffering block 32. The buffering block 32 is used for levelling out possible load variations, and it is also possible to generate several voltages, such as the actual operating voltage Vcc and a programming voltage. For charging the battery, it is advantageous to use a charging device 33.

Figure 3:
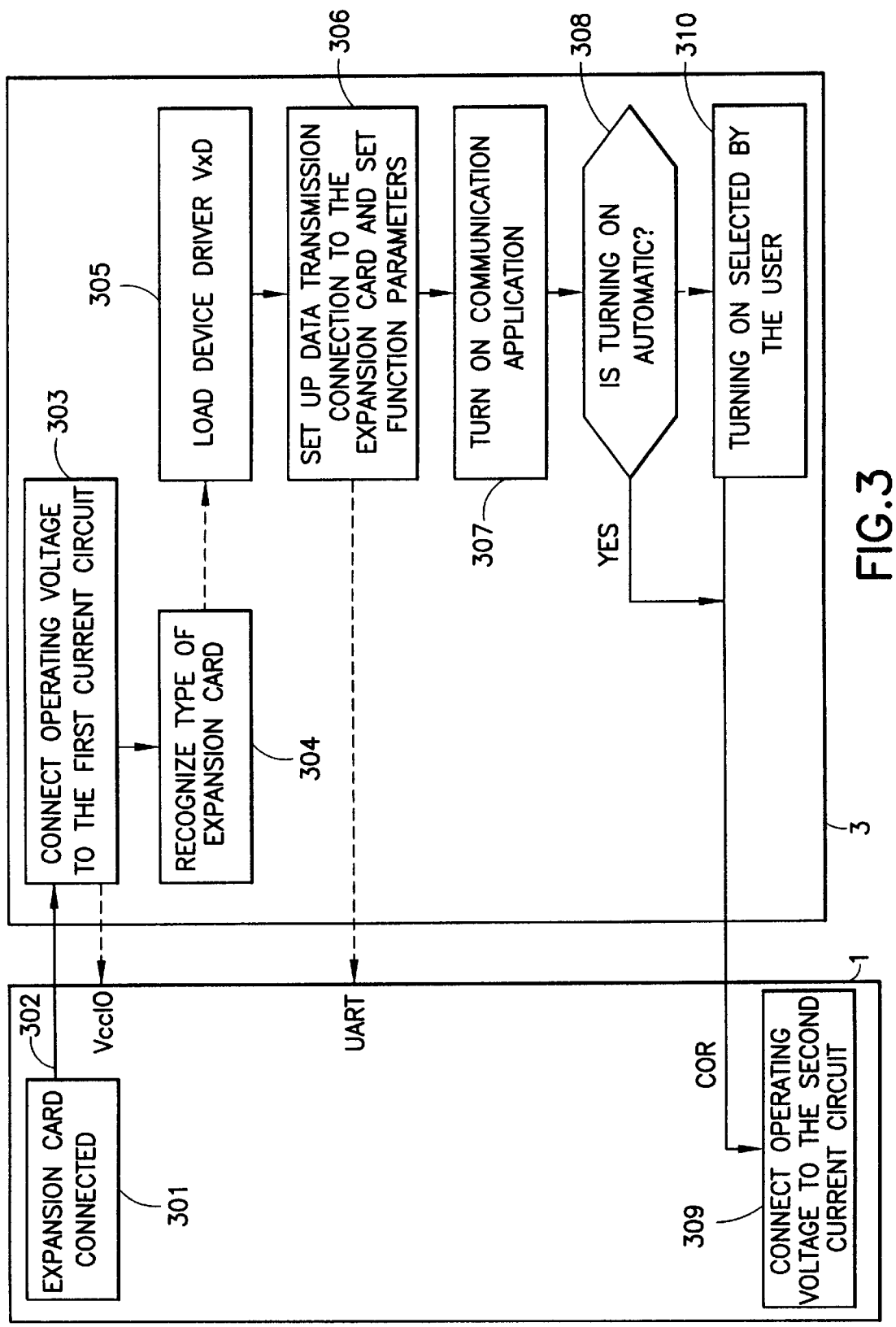
FIG. 3 shows the method according to an advantageous embodiment of the invention in a reduced flow chart.

In the following, the operation of the method according to the invention will be described with reference to the arrangements of FIGS. 1 and 2 and to the flow chart of FIG. 3. It is assumed that the electronic device 3 is in operation and the expansion card 1 is inserted in the expansion card connection 2a of the electronic device (block 301 in FIG. 3). Thus, the electronic device 3 detects the insertion of the expansion card 1 in the expansion card connection 2a. The insertion of the card can be detected e.g. in a way that the expansion card 1 grounds the pins reserved for this in the connector by card detect lines CD1, CD2, wherein an interrupt signal is generated to the controller 16 of the electronic device (arrow 302). As a result, the controller 16 moves on to run an interrupt service program (arrow 303) containing the required procedure pre-programmed, such as providing a reset signal for the expansion card 1, connecting the voltages to the expansion card and reading the CIS database of the card. After this, the controller 16 of the electronic device switches on the operating voltage to the expansion card connection 2a (block 304) if it was not already switched on. In the expansion card 1, the voltages are at this stage turned on advantageously only to the first circuit. To the second circuit, however, the operating voltage is not yet switched on at this stage.

The connection of the expansion card 1 with the electronic device 3 can be detected also by accomplishing an interrupt signal to the controller 16 of the electronic device. A controller interrupt line or the like (not shown) is conducted to the expansion card connection 2b, and an interrupt request is made to the controller 16 by changing the state of the interrupt line e.g. from the logical 1 state to the logical 0 state. The application software of the controller 16 contains an interrupt service program designed to be run by the controller 16. The practical implementations of the interrupt operations depend e.g. on the type of the controller 16, and they are prior art known to person skilled in the art.

The functional elements, such as the series connection blocks (not shown), the card information structure 10d CIS database and the configuration option register COR 10c, that can be addressed at the expansion card 1 via the expansion bus, are defined at different physical addresses in the connection area. The address area comprises e.g. 256 bytes, wherein 8 address lines (A0...A7) will be needed for addressing the addresses of the connection area. Writing via the expansion card connection 2 to the configuration option register COR 10c of the expansion card 1 takes place advantageously in a way that the controller 16 of the expansion card sets, in the data bus of the connector bus 19, the data to be written, and in the address bus, the address of the configuration option register COR 10c, and sets the state of the writing line (IOWR) of the control bus of the connector bus 19 in the logical state corresponding to the write enabling state, such as the logical 0 state. Thus, the data that was in the data bus of the expansion card connection 2 is transferred by the expansion card 1 as the value of the configuration register. At a time, it is possible to write a number of bits that corresponds to the width (bit number) of the data bus, usually one byte, i.e. eight bits, or two bytes, i.e. one word.

In connection with turning on the electronic device 3, an operating system has been turned on, such as Windows® 95 developed by Microsoft, intended for controlling the operation of a computer used as the electronic device 3. In connection with loading the operating system, also device drivers have been loaded into the program memory of the electronic device 3. These device drivers are application programs intended for controlling expansion cards 1, a keypad 21, a display device 22, serial ports (not shown) and the like, connected with the data processor. There are different types of device drivers for different purposes, which is prior art known as such to an expert in the field and which does not need to be described in more detail in this context. The operating system of the electronic device 3, or the like, recognises the type of the expansion card 1 connected to the electronic device 3 and loads the respective device driver to the program memory of the electronic device (block 305).

The device driver conducts also initiallisatlon of the operation of the expansion card 1, including setting of the function parameters required for using the expansion card 1 (block 306). Further, at this stage, a data transmission connection is advantageously set up between the expansion card 1 and the data processor 3 via the expansion card connection 2. In the electronic device 3, the device driver starts a telephone application program or the like, by means of which the user can control the expansion card 1 (block 307). This telephone application program opens up a so-called program window on the display device 22 of the electronic device, in which information can be displayed to the user and which contains data entry fields for information to be entered by the user. Further, this program window advantageously displays information about the operational state of the expansion card 1 and possibly about defects in the expansion card 1. It is obvious that the telephone application program mentioned here is only an example of the application software suitable for using the expansion card 1, but the invention can be applied in also other types of expansion cards and application software.

At the stage of turning on the expansion card 1, the operating voltage switching data defined in the configuration option register COR 10c is in a state corresponding to the state without the operating voltage in the second circuit. This configuration option register COR 10c is formed e.g. in connection with a bus adapter 10.

For turning on the operating voltages, different options can be defined in the second circuit of the expansion card 1, such as automatic connection (turning on) after inserting the expansion card, or connection under control by the user. This turning-on setting is checked by the application program (block 308), and if previously set by the user or if automatic turning on is defined as the default value after inserting the expansion card 1, the telephone application program controls the device driver to couple the operating voltage to the second circuit, i.e. to turn on the control block 4 and the transceiver unit 14 as well as the high-frequency power amplifier 9 in the expansion card 1. This takes place advantageously so that the device driver writes in the configuration option register COR 10c of the expansion card 1, in the operating voltage switching data, a value that corresponds to turning on of the operating voltages (block 309).

If the turning on of the expansion card 1 was not set to take place automatically, the user can control the turning on of the expansion card 1 advantageously by menu functions or the like in the telephone application. Thus, the menu functions are provided with an option field or the like, whose value can be changed by the user to control the turning on of the expansion card 1. Thus, the telephone application program transmits information on the change of state of this option field or the like to the device driver (block 310). The device driver controls the switching of operating voltages to the second circuit of the expansion card 1, as presented above in connection with automatic turning on. In a corresponding manner, the user can disconnect the operating voltages from the second circuit of the expansion card 1, i.e. the control block 4, the transceiver unit 15 and the high-frequency power amplifier 9, using the menu of the telephone application.

In a preferred application, the value of the configuration option register COR 10c contains information on the current mode of the expansion card (memory mode/input-output mode). According to the PCMCIA standard the expansion card is in the memory mode if the six lowest bits of the configuration option register COR 10c are zero, otherwise it is in another mode (input-output mode). When the expansion card 1 is starting, the power consumption is limited because at this stage the operating voltages are not connected to all electronic circuits of the expansion card 1. In the PCMCIA standard, a limit is defined for the power consumption of the expansion card 1 while starting up. This limit is 210 mW for such expansion cards 1 which use 3 V as a supply voltage and 500 mW for such expansion cards 1 which use 5 V as a supply voltage. In normal operation, the power consumption of the expansion card 1 can be considerably higher. The CIS-database 10d contains information on the maximum and mean power consumption of the expansion card 1 in normal operation. The electronic device 3 will read this information from the CIS-database 10d of the expansion card 1. If the maximum or mean power consumption is greater than the power supply capacity of the electronic device 3 it will not allow the expansion card 1 to start. Otherwise the electronic device 3 will change the operation mode of the expansion card 1 from the memory mode to the input/output mode (or another mode specified in CIS database 10d) and load a device driver for the expansion card 1. This can be done in such a way that the electronic device 3 writes a non-zero control value into the configuration option register COR 10c. In this preferred application, this non-zero control value is defined in the CIS-database 10d of the expansion card. As was mentioned above, the electronic device will preferably read the information of the CIS database 10d when the expansion card 1 is starting. Thus the electronic device 3 need not know what bit or bits are used in the expansion card 1 to control the connection of the voltages in the expansion card 1. Furthermore, the electronic device 3 need not know that the expansion card 1 comprises means for connecting the operating voltages in two or more stages. Therefore it is not necessary to provide any specific driver software for the expansion card. 1, but a standard modem driver or the like will suffice to power up the expansion card 1 and to use the expansion card as a standard modem. This is very useful in situations in which the expansion card 1 can be used in different kinds of applications and electronic devices 3. The electronic device 3 can be for example a portable fax machine, a laptop PC with different kinds of operating systems, a personal digital assistant, a soft drink dispenser, etc.

The following is a description on how the voltages are connected in the expansion card 1 of FIG. 1. The control transistor T1 is controlled advantageously on the basis of the operating voltage switching data defined in the configuration option register COR 10c of the expansion card 1, for example by means of a logic circuit provided in the bus adapter. Thus, with the 'no connection' value of the switching data (e.g. the logical 0 state), a voltage value corresponding to approximately the operating voltage Vcc is conducted to the first biasing resistor R2 connected to the base B of the control transistor T1, Thus, the voltage divider formed by the first R2 and second biasing resistor R3 sets the base voltage of the control transistor to be a voltage value (ca. 0.6 V with a silicon alloy transistor) that turns the collector-emitter junction C—E of the control transistor T1 to be conductive. As a result, the voltage of the collector C is close to 0 V and the switching transistor T2 is open.

When the device driver writes, either automatically or on the basis of control by the user, in the configuration option register COR 10c the information on turning on of the operating voltages, the first connection block 10a of the bus adapter turns off the control voltage from the control transistor T1. Thus, the collector-emitter junction of the control transistor T1 does not conduct a current to a significant degree, i.e. the control transistor T1 in a non-conductive state. After this, the initial voltage of the voltage converter 5 starts to toad the retardation capacitor C1 via the voltage supply resistor R1 wherein the voltage between the ends of the retardation capacitor C1 begins to rise. The voltage rising rate is affected by the strength of the initial voltage of the voltage converter 5, the resistance of the voltage supply resistor R1, and the capacitance of the retardation capacitor C1. After the voltage of the retardation capacitor C1, which in this case is substantially the same as the gate voltage of the switching transistor T2, has risen to a value at which the switching transistor T2 moves on to the conductive state, power supply is connected also to the second circuit to the control block 4, the transceiver unit 15 and the high-frequency power amplifier 9. Following this, the control block 4 conducts its own initialisation procedure, whereafter the expansion card is in operational state for example for registration in a mobile communication network, for setting up calls, etc.

The operating voltage of the second circuit can be turned off by setting the operating voltage switching data of the configuration option register COR 10c in a state that corresponds to the state without the operating voltage in the second circuit. Thus, the voltage value of the enabling state is changed to a value corresponding approximately to the operating voltage Vcc, where in the control transistor T1 starts to conduct. As a result, the gate voltage of the switching transistor is reduced close to 0 V and the switching transistor is opened, i.e. power supply to the second circuit is disconnected.

In the arrangement of FIG. 1. the turning on of the voltages is controlled by a switching transistor T2 which is a so-called MOSFET transistor, but it is obvious that this transistor can also be replaced by another semiconductor switch or a mechanical switch or the like.

The enabling line can be implemented also e.g. in connection with a microcontroller, wherein one of the I/O lines of the microcontroller is set as the enabling line. A requirement for this, however, is that the microcontroller is coupled to the first circuit, to which the operating voltage Vcc is coupled upon connecting the expansion card 1 to the electronic device 3.

The present invention is not limited solely to the embodiments presented above, but it can be modified within the scope of the appended claims.

What is claimed is:

1. A method for supplying power to at least one expansion card component of an expansion card (1) that can be connected to an electronic device (3), the expansion card (1) having at least a first circuit (5,6,10) and a second circuit (4,9,15), the method comprising the steps that the power is supplied in at least two stages, wherein at a first one of the stages, at least one operating voltage (Vcc) is connected to the first circuit (5,6,10), and at a second one of the stages, the at least one operating voltage (Vcc) is connected to the second circuit (4,9,15), wherein the second circuit comprises a transceiver (15).

2. The method according to claim 1, characterised in that the second stage is conducted automatically after completion of the first stage.

3. A method for supplying power to at least one expansion card component of an expansion card (1) that can be connected to an electronic device (3), the expansion card (1) having at least a first circuit (5,6,10) and a second circuit (4,9,15), the method comprising the steps that the power is supplied in at least two stages, wherein at a first one of the stages, at least one operating voltage (Vcc) is connected to the first circuit (5,6,10), and at a second one of the stages, the at least one operating voltage (Vcc) is connected to the second circuit (4,9,15), wherein the second stage is controlled by the user of the electronic device (3).

4. The method according to claim 1 characterised in that the expansion card (1) comprises a high-frequency power amplifier (9) for a mobile station, which is connected to the second circuit (4, 9, 15).

5. The method according to any of the claim 3, characterised in that a configuration means (CIS) is formed for storing a control value, and a controlling means (COR) for starting the procedure of the second stage wherein the procedure of the second stage is started by reading the control value from the configuration means (CIS) and writing said control value into the controlling means (COR).

6. An expansion card (1) comprising means (2a, 10) for connection to an electronic device (3), wherein the expansion card (1) comprises:

at least two circuits (5,6,10;4,9,15), and means (10, COR) for supplying power in at least two stages, wherein at a first one of the stages, at least one operating voltage (Vcc) is received by a first one of the circuits (5,6,10), and at a second one of the stages, the at least one operating voltage (Vcc) is received by a second one of the circuits (4,9,15), wherein the second circuit comprises a transceiver (15).

7. The expansion card (1) according to claim 6, characterised in that the second stage is arranged to be conducted automatically after completion of the first stage.

8. The expansion card (1) according to claim 6 characterised in that the expansion card comprises a high-frequency power amplifier (9) for a mobile station, which is coupled to the second circuit (4, 9, 15).

9. An expansion card (1) comprising means (2a, 10) for connection to an electronic device (3), wherein the expansion card (1) comprises:

at least two circuits (5,6,10;4,9,15);

means (10, COR) for supplying power in at least two stages, wherein at a first one of the stages, at least one operating voltage (Vcc) is received by a first one of the circuits (5,6,10), and at a second one of the stages, the at least one operating voltage (Vcc) is received by a second one of the circuits (4,9,15); and the electronic device (3) is equipped with means for conducting the second stage under control by the user of the electronic device (3).

10. A mobile station (1), characterised in that the mobile station (1) comprises at least two circuits (5,6,10;4,9,15), and means (10,COR) for receiving power in at least two stages, and that a transceiver unit (15) and a high-frequency power amplifier (9) of the mobile station are coupled to a second one of the circuits, wherein at a first one of the stages, at least one operating voltage (Vcc) is arranged to be coupled to the first circuit (5,6,10), and at a second one of the stages, the at least one operating voltage (Vcc) is arranged to be coupled to the second circuit (4,9,15).

* * * * *